US010205327B2

United States Patent
Okui

(10) Patent No.: US 10,205,327 B2
(45) Date of Patent: Feb. 12, 2019

(54) BATTERY SYSTEM AND ENERGY STORAGE SYSTEM INCLUDING DISTRIBUTION CONTROLLER FOR SELECTING BATTERY BANKS FOR CHARGING/DISCHARGING

(71) Applicant: SAMSUNG SDI CO., LTD., Yongin-si, Gyeonggi-do (KR)

(72) Inventor: Yoshiaki Okui, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 271 days.

(21) Appl. No.: 15/011,180

(22) Filed: Jan. 29, 2016

(65) Prior Publication Data
US 2016/0226268 A1    Aug. 4, 2016

(30) Foreign Application Priority Data

Jan. 30, 2015    (KR) .................. 10-2015-0015593

(51) Int. Cl.
*H02J 7/00*    (2006.01)
*H02J 3/32*    (2006.01)

(52) U.S. Cl.
CPC ............. *H02J 7/0018* (2013.01); *H02J 3/32* (2013.01); *H02J 7/0014* (2013.01); *H02J 7/0021* (2013.01); *H02J 2007/0067* (2013.01)

(58) Field of Classification Search
CPC ...... H02J 7/0018; H02J 7/0014; H02J 7/0021; H02J 3/32; H02J 2007/0067
USPC ....................................... 320/126, 134, 136
See application file for complete search history.

(56) References Cited

U.S. PATENT DOCUMENTS

2013/0320772 A1* 12/2013 Qiao .................. H01M 10/04
                                                                 307/87
2014/0111163 A1    4/2014 Yamauchi et al.
2016/0126741 A1*  5/2016 Ito .......................... H02J 1/102
                                                                 307/82

FOREIGN PATENT DOCUMENTS

JP        2013-160582 A       8/2013
KR    10-2014-0136792 A      12/2014

OTHER PUBLICATIONS

Abstract and Machine English Translation of Japanese Patent Publication No. 2013-160582 A, Aug. 19, 2013, 33 Pages.

* cited by examiner

*Primary Examiner* — Edward Tso
*Assistant Examiner* — Manuel Hernandez
(74) *Attorney, Agent, or Firm* — Lewis Roca Rothgerber Christie LLP

(57) ABSTRACT

A battery system includes: a plurality of battery banks connected in parallel with each other; and a distribution controller coupled to the battery banks and configured to: receive a command comprising a target charging/discharging amount; determine a priority order between the battery banks based on a state of charge (SOC) and a state of health (SOH) of each of the battery banks; select at least some of the battery banks to be charged or discharged according to the target charging/discharging amount based on the priority order; and perform a charging or discharging on the at least some of the battery banks according to the target charging/discharging amount so that others of the battery banks are paused.

13 Claims, 10 Drawing Sheets

BATTERY SYSTEM AND ENERGY STORAGE SYSTEM INCLUDING DISTRIBUTION CONTROLLER FOR SELECTING BATTERY BANKS FOR CHARGING/DISCHARGING

CROSS-REFERENCE TO RELATED APPLICATION

This application claims priority to and the benefit of Korean Patent Application No. 10-2015-0015593, filed on Jan. 30, 2015, in the Korean Intellectual Property Office, the disclosure of which is incorporated herein in its entirety by reference.

BACKGROUND

1. Field

Aspects of one or more example embodiments of the present invention relate to a battery system and an energy storage system including the battery system.

2. Description of the Related Art

An energy storage system is a storage device storing electric power when demand for the electric power is less and using the stored electric power when demand for the electric power increases, in order to improve and stably operate a power system. Recently, smart grids and new and renewable energy have been widely distributed and the efficiency and stability of power systems have been emphasized, and accordingly, there is a rise in demand for energy storage systems to supply electric power, adjust demands, and improve electric power quality. An output and a capacity of energy storage systems may vary depending on the purpose of using the energy storage system. In order to form a large capacity energy storage system, a plurality of battery systems may be connected in parallel with each other. Because charging and discharging of the battery systems are repeatedly performed, the battery systems degrade and the capacity and an output voltage of the battery system lower. Thus, a method of reducing the degradation of the speed of the battery systems may be desirable.

The above information disclosed in this Background section is only for enhancement of understanding of the background of the invention and therefore it may contain information that does not constitute prior art.

SUMMARY

Aspects of one or more example embodiments include a battery system having a reduced degradation speed and an energy storage system including the battery system.

Additional aspects will be set forth in part in the description which follows and, in part, will be apparent from the description, or may be learned by practice of the presented embodiments.

According to one or more example embodiments, a battery system includes: a plurality of battery banks connected in parallel with each other; and a distribution controller coupled to the battery banks and configured to: receive a command including a target charging/discharging amount; determine a priority order between the battery banks based on a state of charge (SOC) and a state of health (SOH) of each of the battery banks; select at least some of the battery banks to be charged or discharged according to the target charging/discharging amount based on the priority order; and perform a charging or discharging on the at least some of the battery banks according to the target charging/discharging amount so that others of the battery banks are paused.

The battery system may further include: a plurality of direct current (DC)/DC converters that are connected respectively to the plurality of battery banks in series, wherein the battery banks are connected in parallel with each other via the plurality of DC/DC converters, and the distribution controller is configured to control the plurality of DC/DC converters so that the at least some of the battery banks are charged or discharged while the others of the battery banks are paused.

The battery banks may include at least one first battery bank including battery cells of a first number, and at least one second battery bank including battery cells of a second number that is different from the first number, and the plurality of DC/DC converters may include at least one first DC/DC converter connected to the at least one first battery bank, and at least one second DC/DC converter connected to the at least one second battery bank.

The battery banks may include at least one first battery bank including battery cells of a first number, and at least one second battery bank including battery cells of a second number that is different from the first number, the battery system further includes at least one DC/DC converter connected to the at least one first battery bank, and at least one switch connected to the at least one second battery bank, and the distribution controller is configured to control the at least one DC/DC converter and the at least one switch so that the at least some battery banks are charged and discharged while the other battery banks are paused.

The plurality of battery banks may be connected to an electrical grid via a power converter.

The distribution controller may be configured to update the priority order between the plurality of battery banks at every update period.

The distribution controller may be configured to set the update period based on temperatures of the plurality of battery banks, and the update period may be increased when the temperatures lower.

The distribution controller may be configured to update the priority order between the plurality of battery banks whenever a sign of the target charging/discharging amount is inversed.

The distribution controller may be configured to: set a charging limitation amount of a first battery bank among the battery banks having an SOC that is greater than a first critical value as 0 from among the battery banks so that the first battery bank is paused when the distribution controller receives a charging command; and set a discharging limitation amount of a second battery bank among the battery banks having an SOC that is less than a second critical value as 0 from among the battery banks so that the second battery bank is paused when the distribution controller receives a discharging command.

The distribution controller may be configured to grant a higher priority to a first battery bank having lower SOC and higher SOH from among the battery banks when receiving the charging command, and the distribution controller may be configured to grant the higher priority to a second battery bank having higher SOC and higher SOH from among the plurality of battery banks when receiving the discharging command.

The first or second battery bank having higher SOH may have a shorter paused time.

The at least some of the battery banks may have charging/discharging rates (C-rate) that are equal to each other.

The distribution controller may be configured to: compare a total remaining capacity of the plurality of battery banks with a target remaining capacity; generate a corrected target charging/discharging amount by correcting the target charging/discharging amount based on a difference between the total remaining capacity and the target remaining capacity; and the at least some battery banks may be charged or discharged according to the corrected target charging/discharging amount.

In response to the total remaining capacity being greater than the target remaining capacity, the distribution controller may be configured to determine the corrected target charging amount to be less than the target charging amount and to determine the corrected target discharging amount to be greater than the target discharging amount, and in response to the total remaining capacity being less than the target remaining capacity, the distribution controller may be configured to determine the corrected target charging amount to be greater than the target charging amount and to determine the corrected target discharging amount to be less than the target discharging amount.

According to some embodiments of the present invention, an energy storage system includes: a plurality of power converters; a plurality of battery units connected to an electrical grid respectively via the power converters; and a combined controller configured to control the plurality of power converters and the plurality of battery units, wherein each of the plurality of battery units includes: a plurality of battery banks connected in parallel with each other; and a distribution controller configured to: receive a command including a target charging/discharging amount; determine a priority order between the plurality of battery banks based on a state of charge (SOC) and a state of health (SOH) of each of the plurality of battery banks; select at least some battery banks among the battery banks to be charged or discharged according to the target charging/discharging amount based on the priority order; and perform a charging or discharging on the at least some battery banks according to the target charging/discharging amount so that others of the battery banks are paused.

BRIEF DESCRIPTION OF THE DRAWINGS

These and/or other aspects will become more apparent and more readily appreciated from the following description of the example embodiments, taken in conjunction with the accompanying drawings in which.

DETAILED DESCRIPTION

Figure 1:
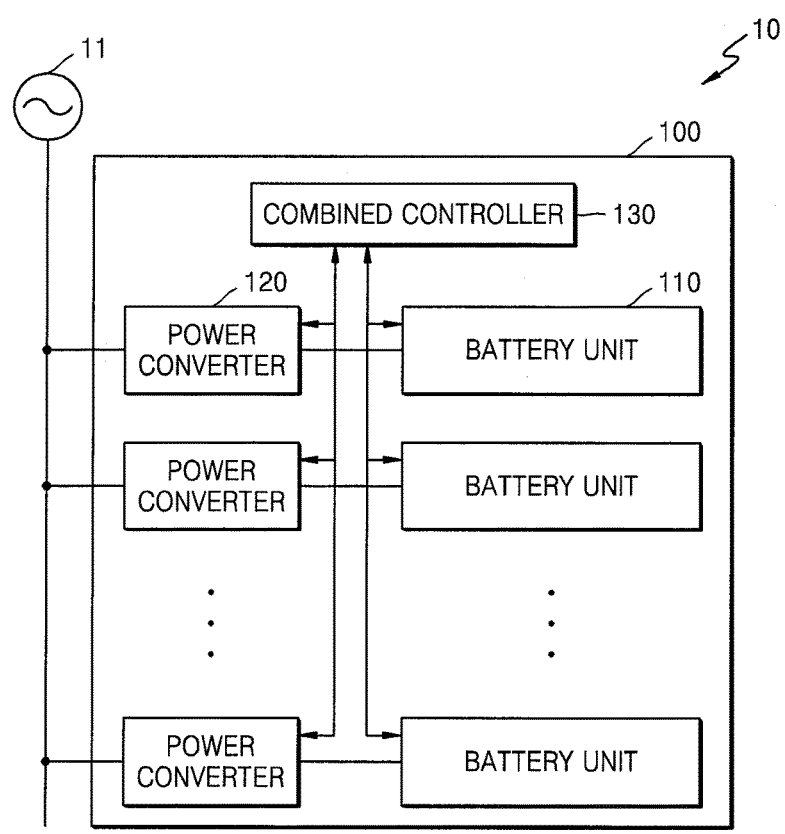
FIG. 1 is a schematic block diagram of an energy storage system, according to some example embodiments of the present invention.

The attached drawings for illustrating example embodiments are referred to in order to gain a better understanding, the merits thereof, and the objectives accomplished by the implementation. As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope are encompassed in the present invention. In the description, certain detailed explanations of the related art may be omitted when it is deemed that they may unnecessarily obscure the characteristics of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Hereinafter, the present invention will be described in detail by explaining preferred embodiments of the present invention with reference to the attached drawings. Like reference numerals in the drawings denote like elements. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic block diagram of an energy storage system 100 according to an example embodiment of the present invention.

Referring to FIG. 1, the energy storage system 100 is connected to an electrical grid 10. The energy storage system 100 stores electric power supplied from a power source 11 of the electrical grid 10, and may supply the stored electric power to the electrical grid 10 again. The electrical grid 10 may also be referred to as a grid system. Although not shown in FIG. 1, the electrical grid 10 may include one or more transformers, and may supply electric power to factories or households via the transformers. Also, a power generation system may be connected to the electrical grid 10, and electric power generated by the power generation system may be supplied to the electrical grid 10 or may be stored in the energy storage system 100.

The energy storage system 100 may include a plurality of battery units 110, a plurality of power converters 120, and a combined controller 130. The battery units 110 may be connected in parallel with each other, and are connected to the electrical grid 10 via the power converters 120. The power converters 120 convert the electric power between the electrical grid 10 and the battery units 110. For example, the power converters 120 may convert alternating current (AC) power of the electrical grid 10 to direct current (DC) power of the battery units 110, or vice versa. Each of the power converters 120 may be a bi-directional inverter converting a DC voltage of the battery unit 110 to an AC voltage of the electrical grid 10, or vice versa.

The combined controller 130 may be coupled or connected to (e.g., in electrical communication with) the battery units 110 and/or the power converters 120 and may control the battery units 110 and the power converters 120. The combined controller 130 senses states of the battery units 110, for example, a voltage, a current, and a temperature, and senses states of the electrical grid 10, for example, a voltage and a current of the electrical grid 10. The combined controller 130 may control the power converters 120 and the battery units 110 to charge the electric power of the electrical grid 10 to the energy storage system 100 or to discharge the electric power of the energy storage system 100 to the electrical grid 10, according to a control from outside or external with respect to the energy storage system 100. The combined controller 130 may operate only some of the power converters 120 and may deactivate the other power converters 120 by taking into account the states of the electrical grid 10 and the states of the battery units 110, so that the battery units 110 connected to the other power converters 120 may be paused.

The battery units 110 may include a plurality of battery cells storing electric energy, for example, lithium ion batteries. Each of the battery units 110 may include a plurality of battery banks connected in parallel with each other, and a distribution controller. The distribution controller receives a command indicating a target charging/discharging amount from the combined controller 130, and determines priority order between the plurality of battery banks based on a state of charge (SOC) and a state of health (SOH) of each of the plurality of battery banks. In addition, the distribution controller selects at least some of battery banks to be charged or discharged according to the target charging/discharging amount based on the priority order, and performs the charging or discharging operation on the at least some of the battery banks according to the target charging/discharging amount, while the other battery banks are paused. The battery unit 110 may be referred to as a battery system, and will be described in more detail below with reference to FIGS. 2 and 3.

Figure 2:
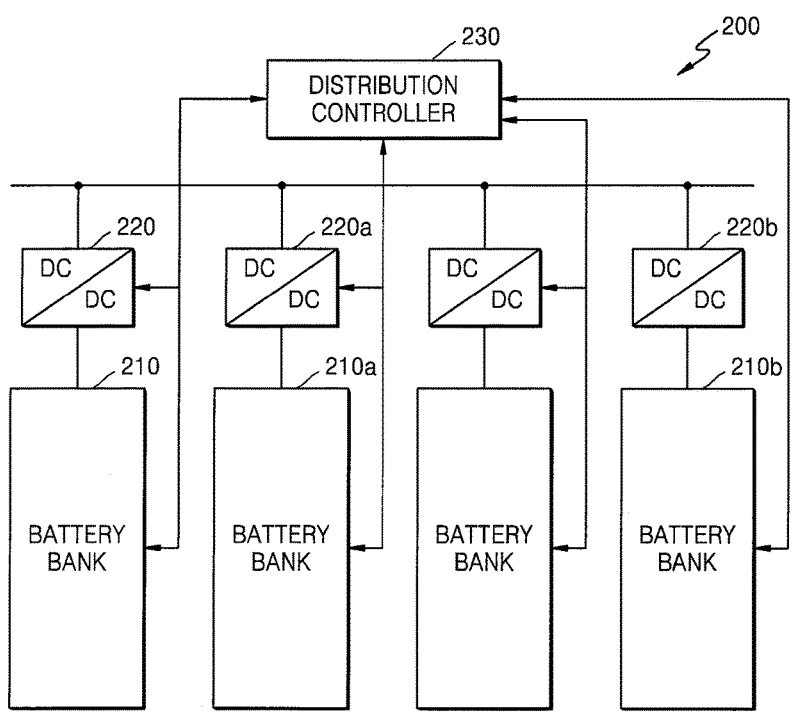
FIG. 2 is a schematic block diagram of a battery system, according to some example embodiments of the present invention.

FIG. 2 is a schematic block diagram of a battery system 200 according to an example embodiment of the present invention.

Referring to FIG. 2, the battery system 200 includes battery banks 210 and a distribution controller 230 connected to or coupled to (e.g., in electronic communication with) the battery banks 210.

The battery banks 210 are connected in parallel with each other. The distribution controller 230 receives a command indicating a target charging/discharging amount, and determines priority order between the battery banks 210 based on the SOC and the SOH of each of the battery banks 210, and selects at least some of the battery banks 210 on which a charging or discharging operation is to be performed according to the target charging/discharging amount. In addition, the distribution controller 230 performs the charging or discharging operation on the at least some of the battery banks 210 according to the target charging/discharging amount, while the other battery banks 210 are paused.

Each of the battery banks 210 may include a plurality of battery cells and a battery management unit for managing the plurality of battery cells. The battery management unit senses voltages, currents, and temperatures of the battery cells, and determines the SOC and the SOH of the battery cells. The battery management unit may provide the distribution controller 230 with information about the SOC and the SOH of the battery cells, that is, the battery bank 210. The battery management unit may perform such functions as overcharge protection, overdischarge protection, overcurrent protection, overvoltage protection, overheat protection, and cell balancing.

FIG. 2 shows that the battery system 200 includes four battery banks 210, but the number of battery banks 210 is not limited thereto. That is, the battery system 200 may include three or less battery banks, or five or greater battery banks 210.

The battery system 200 may correspond to the battery unit 110 of FIG. 1, and the battery banks 210 may be connected to the electrical grid 10 via the power converters 120 of FIG. 1, for example, power conversion devices.

The battery system 200 may further include DC/DC converters 220, as shown in FIG. 2. The distribution controller 230 connected to or coupled to (e.g., in electronic communication with) the DC/DC converters 220. The DC/DC converters 220 may be respectively connected to the battery banks 210 in series, wherein the battery banks 210 are connected to a common node. The battery banks 210 may be connected to one another in parallel via the DC/DC converters 220. The DC/DC converters 220 may receive DC voltages of the battery banks 210 and output the DC voltages to the common node. The distribution controller 230 may control the DC/DC converters 220 so that some of the battery banks 210 perform the charging or discharging according to the target charging/discharging amount and the other battery banks 210 may be paused.

For example, if the battery system 200 is discharging, the distribution controller 230 may increase output voltages of the DC/DC converters 220 connected to some of the battery banks 210 and reduce the output voltage of the DC/DC converters 220 connected to the other battery banks 210, and thus, some of the battery banks 210 may be discharged while the other battery banks 210 are paused. If the battery system 200 is charging, the distribution controller 230 may reduce the output voltages of the DC/DC converters connected to some of the battery banks 210 and increase the output voltages of the DC/DC converters 220 connected to the other battery banks 210, and thus, some of the battery banks 210 may be charged while the other battery banks 210 are paused.

The battery banks 210 may include an equal number of battery cells. According to another example embodiment, the battery banks 210 may include at least one first battery bank 210a including a first number of battery cells, and at least one second battery bank 210b including a second number of battery cells. Correspondingly, the DC/DC converters 220 may include at least one first DC/DC converter 220a connected to the at least one first battery bank 210a, and at least one second DC/DC converter 220b connected to the at least one second battery bank 210b.

The distribution controller 230 may update the priority order between the battery banks 210 at every update period. The priority order between the battery banks 210 changes at every update period. Therefore, some of the battery banks 210 that are charged or discharged are continuously changed, and the other battery banks 210 may be paused.

The distribution controller 230 may be configured to set the update period based on the temperatures of the battery banks 210. The battery banks 210 may provide temperature information to the distribution controller 230. The lower the temperatures of the battery banks 210 are, the faster the degradation speed is. In order to reduce the degradation speed at a lower temperature, a paused time of the battery banks 210 may be increased. As the temperatures of the battery banks 210 lower, the update period may be set to be longer. Thus, if the battery banks 210 have lower temperatures, the battery banks 210 that start to pause may ensure a long pause time. On the other hand, if the battery banks 210 have high temperatures, the battery banks 210 that start to pause may have a short pause time, and then, may be charged or discharged again. However, if the temperatures of the battery banks 210 are high, the degradation speed does not increase even with the short pause time.

The distribution controller 230 may update the priority order between the battery banks 210 whenever positive and negative signs of the target charging/discharging amount change. In the present specification, the target charging/discharging amount denotes the amount or speed to be charged or discharged by the battery system 200. If the target charging/discharging amount has a positive value, the target charging/discharging amount denotes the amount to be charged by the battery system 200, and may be referred to as a target charging amount. If the target charging/discharging amount has a negative value, the target charging/discharging amount may denote the amount to be discharged from the battery system 200 and may be referred to as a target discharging amount. The target charging/discharging amount is a concept corresponding to a charging/discharging rate (C-rate) and may be expressed in units of MW.

If the sign of the target charging/discharging amount is inversed, it denotes that a mode of the battery system 200 is changed between a charging mode and a discharging mode. The priority order between the battery banks 210 may be updated on changing the charging mode to the discharging mode, or vice versa.

The distribution controller 230 may set a charging limitation amount of the battery bank 210 having a charged status that is greater than a first critical value, for example, 90, to be 0. Even if the distribution controller 230 receives a charging command, the charging is not performed on the battery bank 210 having a charging status that is greater than the first critical value. Thus, the overcharging of the battery bank 210 may be prevented.

The distribution controller 230 may set a discharging limitation value of the battery bank 210 having a charged status that is less than a second critical value, for example, 10, to be 0, among the battery banks 210. Even if the distribution controller 230 receives a discharging command, the discharging may not be performed on the battery bank 210 having a charged status that is less than the second critical value. Thus, the overdischarging of the battery bank 210 may be prevented.

If the distribution controller 230 receives the charging command, that is, the command including a positive target charging/discharging amount, the distribution controller 230 may grant a higher priority to a battery bank 210 having lower SOC and/or higher SOH among the plurality of battery banks 210. If the distribution controller 230 receives the discharging command, that is, the command including a negative charging/discharging amount, the distribution controller 230 may grant a higher priority to a battery bank 210 having higher SOC and/or higher SOH among the plurality of battery banks 210.

If the distribution controller 230 receives the charging command, the battery bank 210 having a lower SOC may have higher priority. In this case, the charging is performed on that battery bank 210, the SOC of the battery bank 210 increases, and after that, the priority of the battery bank 210 may be lowered at a next priority update. The battery bank 210 is not charged any more, and thus, may be paused.

If the distribution controller 230 receives the discharging command, the battery bank 210 having a higher SOC may have higher priority. Because the battery bank 210 is discharged, the SOC of the battery bank 210 is lowered, and after that, the priority of the battery bank 210 may be lowered at the next priority update. The battery bank 210 may be paused due to the lowered priority, and thus, may not be discharged any more.

A battery bank 210 having higher SOH may have higher priority than a battery bank 210 having lower SOH. The battery bank 210 having a higher SOH may more likely be charged or discharged than the battery bank 210 having a lower SOH, and may have a shorter pause time than the battery bank 210 having a lower SOH. If the SOH of the battery bank 210 is high, the degradation speed does not increase even with the short pause time. However, if the SOH of the battery bank 210 is lower, the degradation speed is only reduced when the pause time increases. According to the present example embodiment, because the battery bank 210 having a higher SOH is charged or discharged more frequently than the battery bank 210 having a lower SOH, the degradation speed of the battery system 200 may be reduced.

The distribution controller 230 selects at least some of the battery banks 210 to be charged or discharged according to the priority order, and may perform the charging or discharging of the selected battery banks 210 according to the target charging/discharging amount. The selected battery banks 210 may be charged or discharged with an equal charging/discharging rate (C-rate). If some of the selected battery banks 210 are charged or discharged by a maximum C-rate, the charging or discharging efficiency degrades, because a case where the charging or discharging is performed with a C-rate that is lower than the maximum C-rate has a higher charging or discharging efficiency than a case where the charging or discharging is performed with the maximum C-rate. According to the present example embodiment, because the selected battery banks 210 are all charged or discharged with the same C-rate, the charging may be performed with a C-rate that is lower than the maximum C-rate, and accordingly, the charging or discharging efficiency may be improved.

The battery system 200 may maintain a constant target charging state, for example, 50, according to an installation purpose thereof. The distribution controller 230 compares an actual SOC of the battery banks 210 with the target SOC, and corrects the target charging/discharging amount based on a difference between an actual SOC and the target SOC to generate a corrected target charging/discharging amount. The distribution controller 230 may be configured to perform the charging or discharging operation on at least some of the battery banks 210 based on the corrected target charging/discharging amount.

For example, if the actual SOC of the battery banks 210 is greater than the target SOC, for example, if the actual SOC of the battery banks 210 is 60, the corrected target discharging amount may be determined to be greater than the target discharging amount. Because the battery system 200 is discharged more than the target discharging amount, the actual SOC of the battery banks 210 may become closer to the target SOC. Also, the corrected target charging amount may be determined to be less than the target charging amount. The battery system 200 may be charged less than the target charging amount.

If the actual SOC of the battery banks 210 is less than the target SOC, for example, if the actual SOC of the battery banks 210 is 40, the corrected target charging amount may be determined to be greater than the target charging amount. Because the battery system 200 is charged more than the target charging amount, the actual SOC of the battery banks 210 may become closer to the target SOC. The target discharging amount may be determined to be less than the target discharging amount, and thus, the battery system 200 may be discharged less than the target discharging amount.

Figure 3:
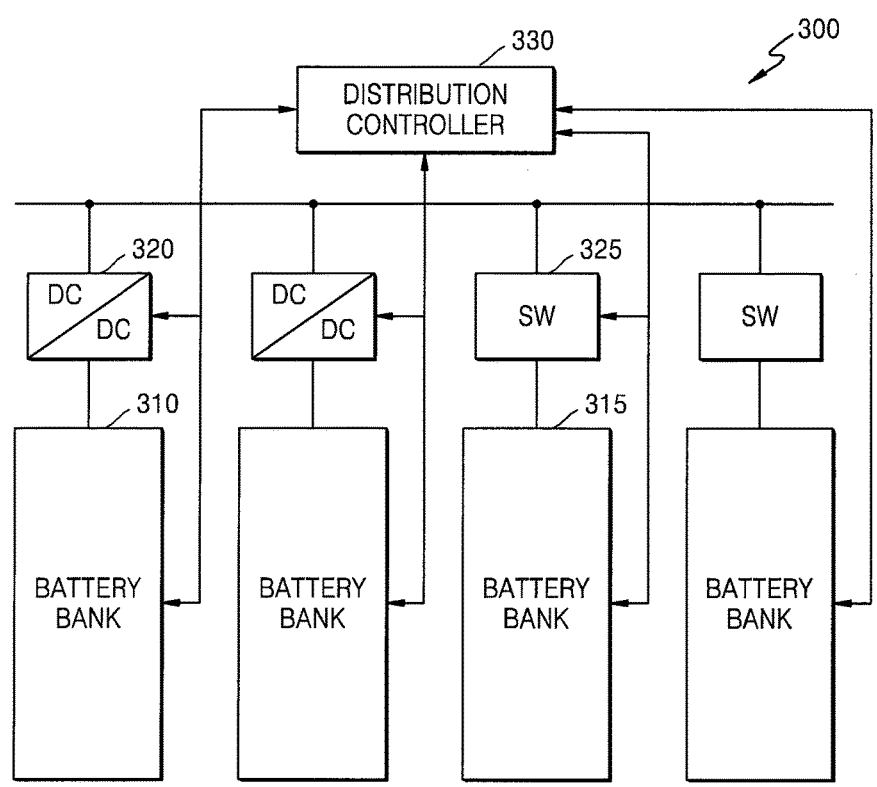
FIG. 3 is a schematic block diagram of a battery system, according to some example embodiments of the present invention.

FIG. 3 is a schematic block diagram of a battery system 300 according to another example embodiment of the present invention.

Referring to FIG. 3, the battery system 300 includes first battery banks 310, second battery banks 315, and a distribution controller 330. The distribution controller 330 may be connected to or coupled to (e.g., in electronic communication with) the first battery banks 310 and the second battery banks 315. Each of the first battery banks 310 includes a first number of battery cells, and each of the second battery banks 315 may include a second number of battery cells. For example, each of the first battery banks 310 may include 168 battery cells that are connected in series, and each of the second battery banks 315 may include 252 battery cells that are connected in series.

The battery system 300 may include DC/DC converters 320 respectively connected to the first battery banks 310, and switches 325 connected respectively to the second battery banks 315. The distribution controller 330 may be connected to or coupled to (e.g., in electronic communication with) the DC/DC converters 320 and the switches 325. The distribution controller 330 may control the DC/DC converters 320 and the switches 325 so that some battery banks among the first battery banks 310 and the second battery banks 315 are charged or discharged while the other battery banks are paused.

The first battery banks 310 and the second battery banks 315 correspond to the battery banks 210 of FIG. 2, and the distribution controller 330 may correspond to the distribution controller 230 of FIG. 2. Thus, some repetitive detailed descriptions thereof are not provided here.

Operations of the distribution controller 230 of FIG. 2 and the distribution controller 330 of FIG. 3 will be described in more detail below with reference to FIGS. 4 to 10.

Figure 4:
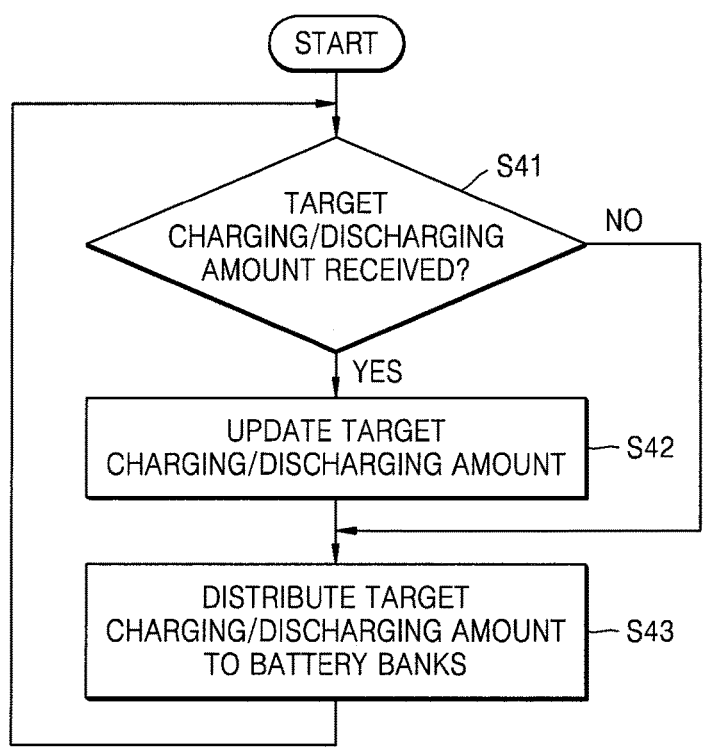
FIG. 4 is a flowchart illustrating operations of a distribution controller, according to some example embodiments of the present invention.

FIG. 4 is a flowchart illustrating operations of the distribution controller according to the example embodiment.

Referring to FIG. 4, the distribution controller may receive a command including a target charging/discharging amount (operation S41). For example, the distribution controller may receive a command including the target charging/discharging amount from the combined controller (e.g., element 130 of FIG. 1). If the target charging/discharging amount has a positive value, the command is a charging command, and if the target charging/discharging amount has a negative value, the command may be a discharging command.

When the distribution controller receives the command including the target charging/discharging amount, the distribution controller may update the previous target charging/discharging amount with a newly received target charging/discharging amount (operation S42). The distribution controller allocates the new target charging/discharging amount so that at least some of the battery banks may be charged or discharged (operation S43).

If the distribution controller does not receive the command including the target charging/discharging amount, the distribution controller may control the at least some of the battery banks to be charged or discharged based on the previous target charging/discharging amount.

Figure 5:
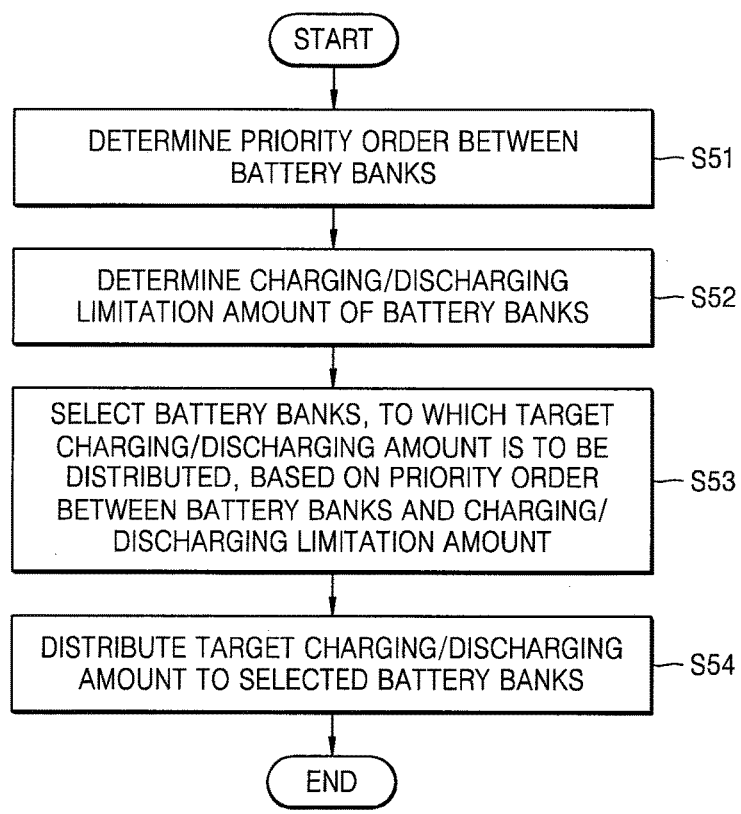
FIG. 5 is a flowchart illustrating an operation of distributing a target charging/discharging amount to battery banks in the distribution controller of FIG. 4.

FIG. 5 is a flowchart illustrating the operation of the distribution controller to allocate the target charging/discharging amount to the battery banks (e.g., operation S43 in FIG. 4).

Referring to FIG. 5, the distribution controller may determine priority order between the battery banks (operation S51). The determination of the priority order between the battery banks (S51) will be described in more detail below with reference to FIG. 6.

The distribution controller may determine a charging/discharging limitation amount of the battery banks (operation S52). The determination of the charging/discharging limitation amount of the battery banks (operation S52) will be described in more detail below with reference to FIG. 7.

The distribution controller may select battery banks, to which the target charging/discharging amount is to be distributed, based on the priority order between the battery banks and the charging/discharging limitation amount (operation S53). The selecting of the battery banks, to which the target charging/discharging amount is to be distributed, based on the priority order between the battery banks and the charging/discharging limitation amount (operation S53) will be described in more detail below with reference to FIG. 8.

The distribution controller may distribute the target charging/discharging amount to the battery banks that are selected in operation S53 (operation S54). The distribution controller may distribute the target charging/discharging amount so that the selected battery banks may be charged or discharged with an equal C-rate.

Figure 6:
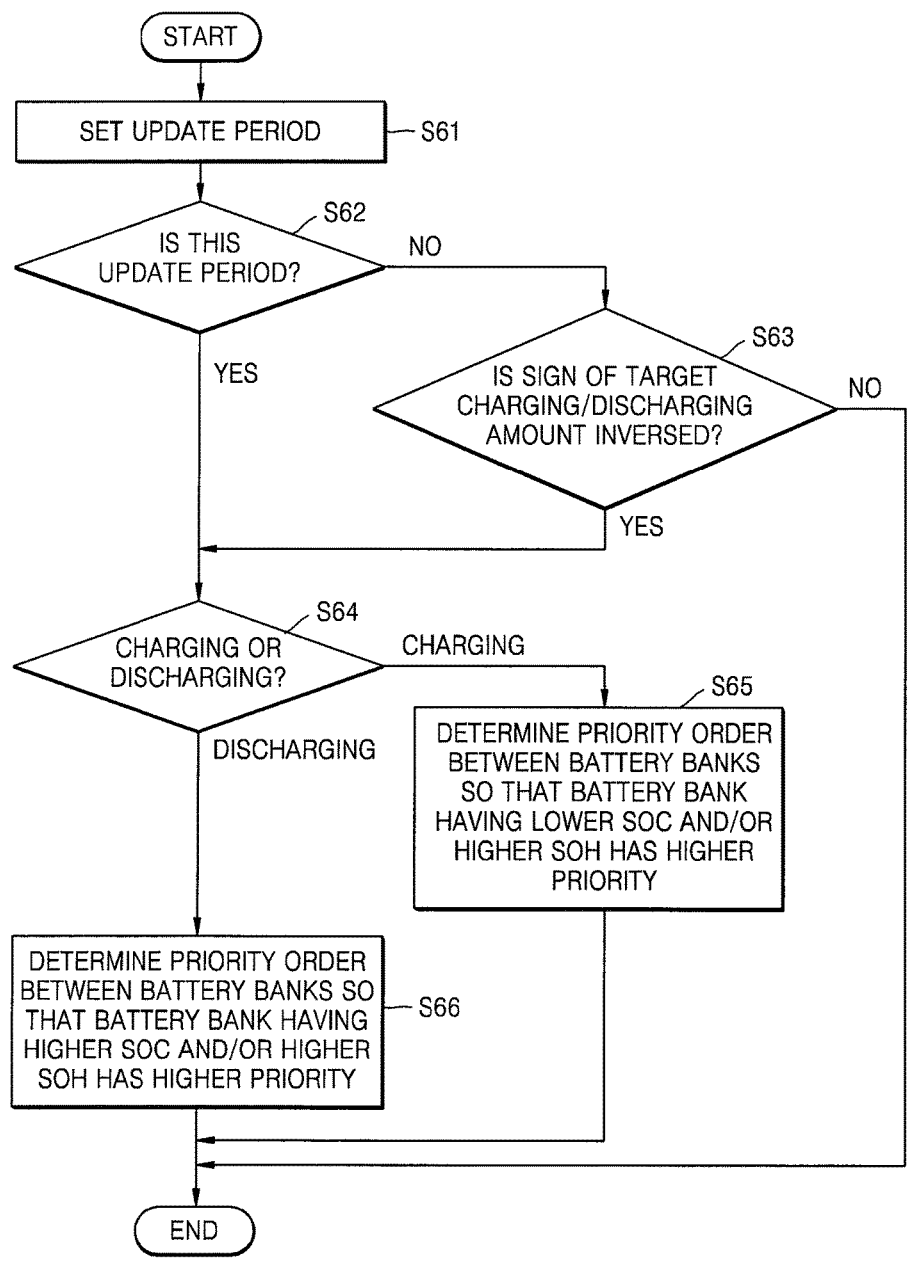
FIG. 6 is a flowchart illustrating operations of determining priorities between the battery banks in the distribution controller of FIG. 4.

FIG. 6 is a flowchart illustrating operations in determining the priority order between the battery banks (e.g., operation S51 in FIG. 5) in the distribution controller.

Referring to FIG. 6, the distribution controller may set an update period based on the temperature of the battery banks (operation S61). That is, the distribution controller may set the update period to be longer as the temperature of the battery banks is lowered. If the update period becomes longer, a paused time increases. If the paused time increases, unbalancing between the SOCs of the battery banks increases. However, the degradation speed of the battery banks may be reduced even with the low temperature of the battery banks, owing to the sufficiently long paused time.

The distribution controller may determine whether the current time corresponds to the update period (operation S62). If the current time does not correspond to the update period, the distribution controller may determine whether the sign of the target charging/discharging amount is inversed (operation S63). Inversion of the sign of the target charging/discharging amount denotes that the charging mode changes to the discharging mode, or vice versa. If the sign of the target charging/discharging amount is not inversed, the priority order between the battery banks is not updated.

If the current time corresponds to the update period or the sign of the target charging/discharging amount has changed, the distribution controller may determine whether the current mode is the charging mode or the discharging mode based on the target charging/discharging amount (operation S64). For example, if the target charging/discharging amount has a positive value, it may be determined to be the charging mode, and if the target charging/discharging amount has a negative value, it may be determined to be the discharging mode.

In the case of the charging mode, the distribution controller may determine the priority order between the battery banks so that the battery bank having lower SOC and/or higher SOH may have higher priority (operation S65). The battery bank having a lower SOC may be more likely to be charged than the battery bank having a higher SOC. The battery bank having a higher SOH may be more likely to be charged than the battery bank having a lower SOH.

In the case of the discharging mode, the distribution controller may determine the priority order between the battery banks so that the battery bank having higher SOC and higher SOH may have higher priority (operation S66). The battery bank having a higher SOC may be more likely to be discharged than the battery bank having a lower SOC. The battery bank having a higher SOH may be more likely to be discharged than the battery bank having a lower SOH.

Figure 7:
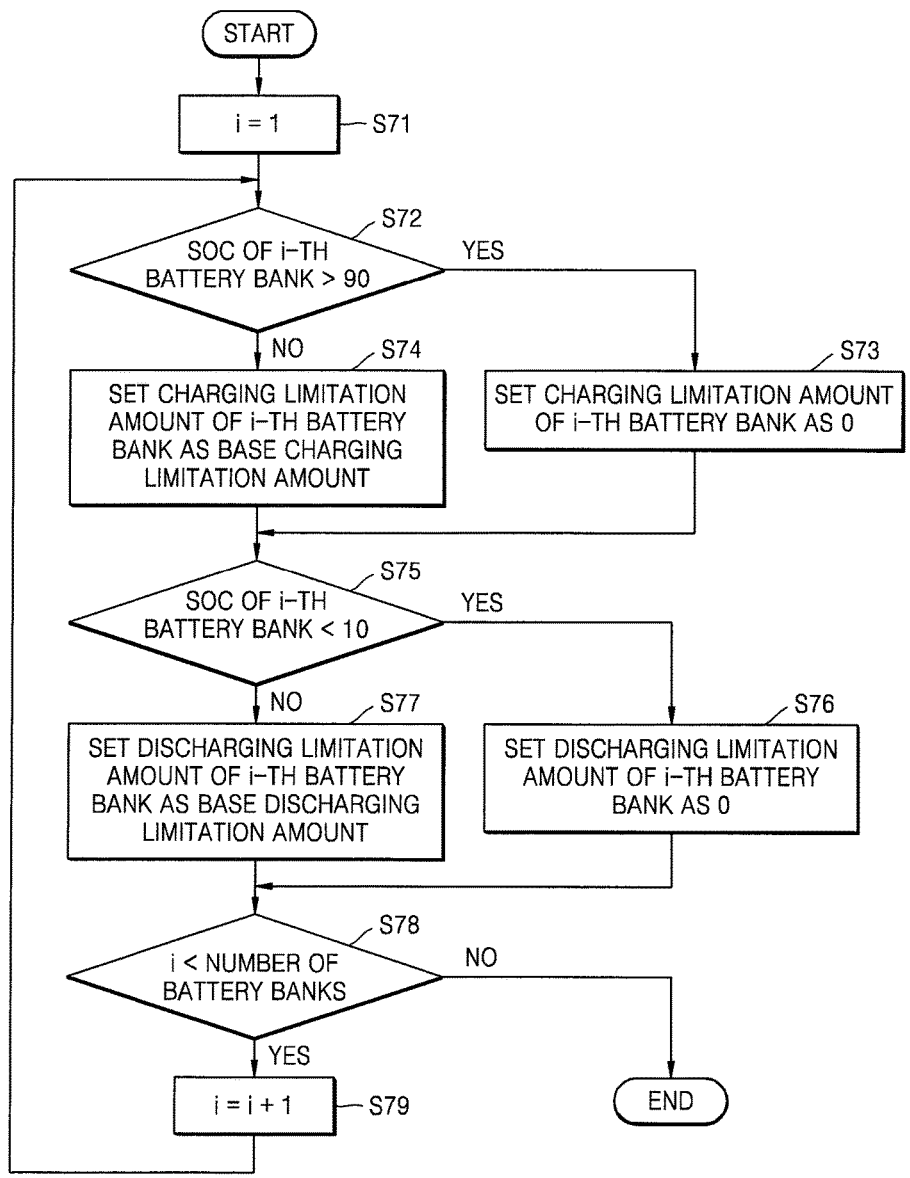
FIG. 7 is a flowchart illustrating operations of determining a limitation in charging/discharging amount of the battery banks in the distribution controller of FIG. 4.

FIG. 7 is a flowchart illustrating operations in determining the charging/discharging limitation amount of the battery banks (operation S52) in the distribution controller.

Referring to FIG. 7, the distribution controller sets i to be 1 (operation S71). Here, i denotes an index number of a battery bank.

The distribution controller determines whether the SOC of an i-th battery bank exceeds a first critical value, e.g., 90 (operation S72). If the SOC of the i-th battery bank exceeds the first critical value (e.g., 90), the distribution controller sets a charging limitation value of the i-th battery bank as 0 (operation S73). The charging limitation value is a value for restricting a charged amount in a battery bank, and the battery bank may be charged to the charging limitation value to the maximum. That is, the battery bank may be charged to a charging amount that is equal to or less than the charging limitation value.

If the SOC of the i-th battery bank does not exceed the first critical value (e.g., 90), the distribution controller sets the charging limitation value of the i-th battery bank as a base charging limitation amount (operation S74). The distribution controller may store information about the base charging limitation value of the i-th battery bank.

The distribution controller determines whether the SOC of the i-th battery bank is less than a second critical value (e.g., 10) (operation S75). If the SOC of the i-th battery bank is less than the second critical value (e.g., 10), the distribution controller sets the discharging limitation value of the i-th battery bank as 0 (operation S76). The discharging limitation value denotes a value for restricting a discharged amount of a battery bank, and the battery bank may be only discharged to the discharging limitation value to the maximum. That is, the battery bank may be discharged less than the discharging limitation value.

If the SOC of the i-th battery bank is not less than the second critical value (e.g., 10), the distribution controller sets the discharging limitation amount of the i-th battery bank as a base discharging limitation amount (operation S77). The distribution controller may store information about the base discharging limitation amount of the i-th battery bank.

The distribution controller determines whether i is less than the number of battery banks (operation S78). If i is less than the number of battery banks, the distribution controller increases i by 1 in order to perform operations S72 to S77 on a next battery bank (operation S79).

If i is equal to the number of battery banks, it denotes that operations S72 to S77 were performed on all the battery banks, and the process is finished.

Figure 8:
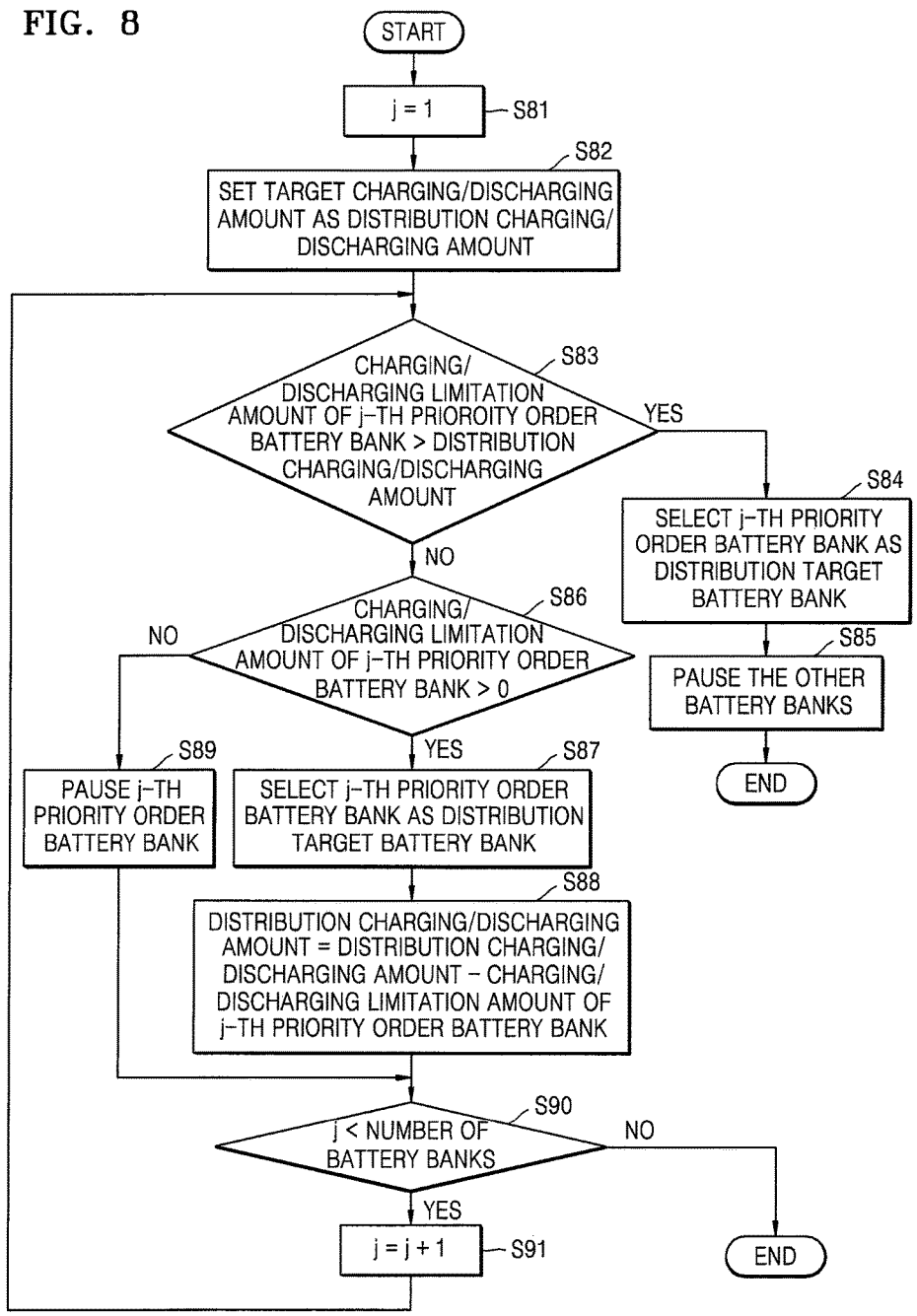
FIG. 8 is a flowchart illustrating an operation of selection battery banks, to which target charging/discharging amounts are to be allocated, based on priorities of the battery banks and limitation in charging/discharging amount, in the distribution controller of FIG. 4.

FIG. 8 is a flowchart illustrating operations in selecting of the battery banks, to which the target charging/discharging amount is to be distributed, based on the priority order and the charging/discharging limitation amount (operation S53) in the distribution controller.

Referring to FIG. 8, the distribution controller sets j as 1 (operation S81). Here, j denotes a priority order of a battery bank.

The distribution controller sets the target charging/discharging amount as a distribution charging/discharging amount (operation S82). The distribution charging/discharging amount is a variable that is temporarily used to select the battery banks, to which the target charging/discharging amount is to be distributed.

The distribution controller determines whether the charging/discharging limitation amount of a j-th priority order battery bank is greater than the distribution charging/discharging amount (operation S83).

If the charging/discharging limitation amount of the j-th priority order battery bank is greater than the distribution charging/discharging amount, the distribution controller may select the j-th priority order battery bank as a last battery bank to be distributed (operation S84). The distribution controller does not select the other battery banks as the battery banks to be distributed so as to pause the other battery banks (operation S85), and then, finishes the process.

If the charging/discharging limitation amount of the j-th priority order battery bank is equal to the distribution charging/discharging amount, it is determined whether the charging/discharging limitation amount of the j-th priority order battery bank is greater than 0 (operation S86).

If the charging/discharging limitation amount of the j-th priority order battery bank is greater than 0, the j-th priority battery bank is selected as the battery bank of a distribution target (operation S87), the distribution charging/discharging amount is updated as a value obtained by subtracting the charging/discharging limitation amount of the j-th priority order battery bank from the distribution charging/discharging amount (operation S88).

If the charging/discharging limitation amount of the j-th priority order battery bank is 0, the distribution controller does not select the j-th priority order battery bank so as to pause the j-th priority order battery bank.

The distribution controller determines whether j is less than the number of battery banks (operation S90). If j is less than the number of battery banks, the distribution controller increases j by 1 in order to perform operations S83 to S89 on the battery bank of the next priority order (operation S91).

If j is equal to the number of battery banks, it denotes that operations S83 to S89 were performed on all the battery banks, the process is finished.

Figure 9:
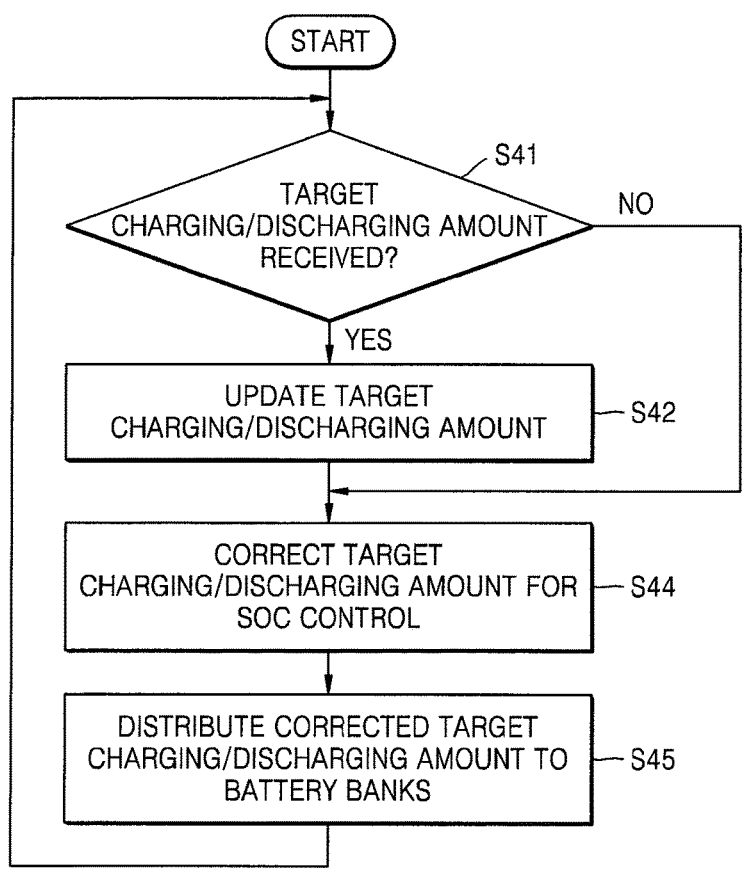
FIG. 9 is a flowchart illustrating operations of a distribution controller, according to some example embodiments of the present invention.

FIG. 9 is a flowchart illustrating operations of the distribution controller according to the example embodiment.

Referring to FIG. 9, the distribution controller may receive the command including the target charging/discharging amount (operation S41). For example, the distribution controller may receive the command including the target charging/discharging amount from the combined controller 130 (see, e.g., FIG. 1). If the target charging/discharging amount has a positive value, the command may be a charging command, and if the target charging/discharging amount has a negative value, the command may be a discharging command.

When the distribution controller receives the command including the target charging/discharging amount, the target charging/discharging amount transmitted previously to the distribution controller may be updated as a newly received target charging/discharging amount (operation S42). If the distribution controller does not receive the command including the target charging/discharging amount, the distribution controller may maintain the previous target charging/discharging amount.

The distribution controller may correct the target charging/discharging amount so as to control the SOC of the battery system, and then, may generate a corrected target charging/discharging amount (operation S44).

The distribution controller may control at least some of the battery banks to be charged or discharged based on the corrected target charging/discharging amount (operation S45). Operation S45 is the same as operation S43, except that the corrected target charging/discharging amount is used instead of the target charging/discharging amount. That is, the distribution controller may execute the operations illustrated in FIGS. 5 to 8 by using the corrected target charging/discharging amount, instead of using the target charging/discharging amount.

Figure 10:
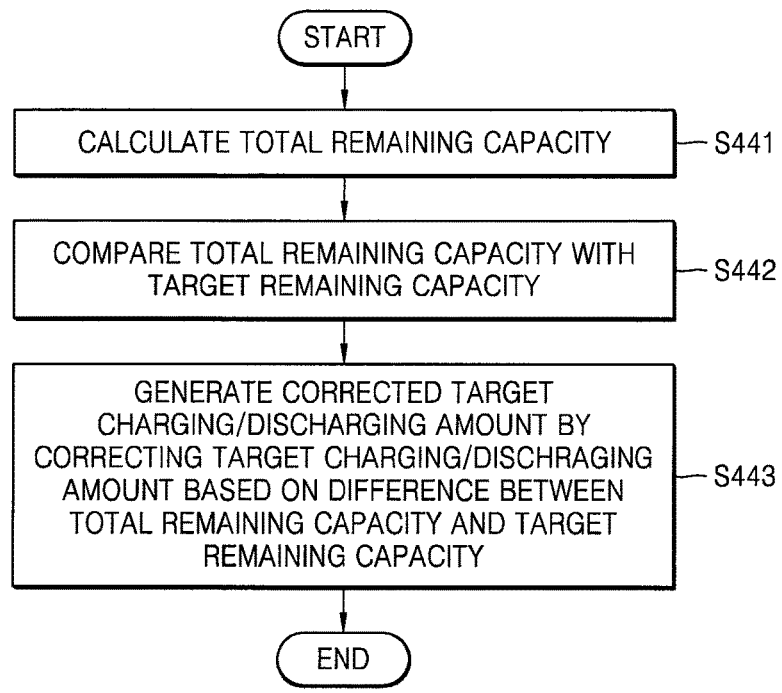
FIG. 10 is a flowchart illustrating operations of correcting a target charging/discharging amount in the distribution controller to control a state of charge (SOC), according to some example embodiments of the present invention.

FIG. 10 is a flowchart illustrating operations of the distribution controller in order to correct the target charging/discharging amount for controlling the SOC (S44).

Referring to FIG. 10, the distribution controller may calculate a total remaining capacity of the battery banks (operation S441). The remaining capacity corresponds to the SOC and may be expressed in units of MW. The distribution controller may compare the total remaining capacity with a target remaining capacity (operation S442). The target remaining capacity corresponds to the target SOC, and may be a capacity corresponding to the SOC of 50.

The distribution controller corrects the target charging/discharging amount based on a difference between the total remaining capacity and the target remaining capacity to generate the corrected target charging/discharging amount (operation S443).

For example, if the total remaining capacity of the battery banks is greater than the target remaining capacity, the corrected target discharging amount may be determined to be greater than the target discharging amount. Because the battery system is discharged more than the target discharging amount, the total remaining capacity of the battery banks becomes closer to the target remaining capacity. If the total remaining capacity of the battery banks is less than the target remaining capacity, the corrected target charging amount may be determined to be greater than the target charging amount. Because the battery system is charged more than the target charging amount, the total remaining capacity of the battery banks may become closer to the target remaining capacity.

The particular implementations shown and described herein are illustrative examples of the present invention and are not intended to otherwise limit the scope of the present invention in any way. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the present invention unless the element is specifically described as "essential" or "critical".

The use of the terms "a", "an", and "the" and similar referents in the context of describing the present invention (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present invention is not limited to the described order of the steps. The use of any and all examples, or example language (e.g., "such as") provided herein, is intended merely to better illuminate the present invention and does not pose a limitation on the scope of the present invention unless otherwise claimed. Numerous modifications and adaptations will be readily apparent to one of ordinary skill in the art without departing from the spirit and scope.

It should be understood that the example embodiments described therein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims, and their equivalents.

What is claimed is:

1. A battery system comprising:
    a plurality of battery banks connected in parallel with each other; and
    a distribution controller coupled to the battery banks and configured to:
        receive a command comprising a target charging/discharging amount;
        determine a priority order between the battery banks based on a state of charge (SOC) and a state of health (SOH) of each of the battery banks;
        update the priority order between the plurality of battery banks at every update period, wherein the distribution controller is configured to adjust the update period based on temperatures of the plurality of battery banks, and the update period is increased when the temperatures lower;
        select at least some of the battery banks to be charged or discharged according to the target charging/discharging amount based on the priority order; and
        perform a charging or discharging on the at least some of the battery banks according to the target charging/discharging amount so that others of the battery banks are paused.

2. The battery system of claim 1, further comprising a plurality of direct current (DC)/DC converters that are connected respectively to the plurality of battery banks in series,
    wherein the battery banks are connected in parallel with each other via the plurality of DC/DC converters, and the distribution controller is configured to control the plurality of DC/DC converters so that the at least some of the battery banks are charged or discharged while the others of the battery banks are paused.

3. The battery system of claim 2, wherein the battery banks comprise at least one first battery bank comprising battery cells of a first number, and at least one second battery bank comprising battery cells of a second number that is different from the first number, and
    the plurality of DC/DC converters comprise at least one first DC/DC converter connected to the at least one first battery bank, and at least one second DC/DC converter connected to the at least one second battery bank.

4. The battery system of claim 1, wherein the battery banks comprise at least one first battery bank comprising battery cells of a first number, and at least one second battery bank comprising battery cells of a second number that is different from the first number,
    the battery system further comprises at least one DC/DC converter connected to the at least one first battery bank, and at least one switch connected to the at least one second battery bank, and
    the distribution controller is configured to control the at least one DC/DC converter and the at least one switch so that the at least some battery banks are charged and discharged while the other battery banks are paused.

5. The battery system of claim 1, wherein the plurality of battery banks are connected to an electrical grid via a power converter.

6. The battery system of claim 1, wherein the distribution controller is configured to update the priority order between the plurality of battery banks whenever a sign of the target charging/discharging amount is inversed.

7. The battery system of claim 1, wherein the distribution controller is configured to:
    set a charging limitation amount of a first battery bank among the battery banks having an SOC that is greater than a first critical value as 0 from among the battery banks so that the first battery bank is paused when the distribution controller receives a charging command; and
    set a discharging limitation amount of a second battery bank among the battery banks having an SOC that is less than a second critical value as 0 from among the battery banks so that the second battery bank is paused when the distribution controller receives a discharging command.

8. The battery system of claim 1, wherein the distribution controller is configured to grant a higher priority to a first battery bank having lower SOC and higher SOH from among the battery banks when receiving the charging command, and the distribution controller is configured to grant the higher priority to a second battery bank having higher SOC and higher SOH from among the plurality of battery banks when receiving a discharging command.

9. The battery system of claim 8, wherein the first or second battery bank having higher SOH has a shorter paused time.

10. The battery system of claim 1, wherein the at least some of the battery banks have charging/discharging rates (C-rate) that are equal to each other.

11. The battery system of claim 1, wherein the distribution controller is configured to:
    compare a total remaining capacity of the plurality of battery banks with a target remaining capacity;
    generate a corrected target charging/discharging amount by correcting the target charging/discharging amount based on a difference between the total remaining capacity and the target remaining capacity; and
    the at least some battery banks are charged or discharged according to the corrected target charging/discharging amount.

12. The battery system of claim 11, wherein,
    in response to the total remaining capacity being greater than the target remaining capacity, the distribution controller is configured to determine the corrected target charging amount to be less than the target charging amount and to determine the corrected target discharging amount to be greater than the target discharging amount, and
    in response to the total remaining capacity being less than the target remaining capacity, the distribution controller is configured to determine the corrected target charging amount to be greater than the target charging amount and to determine the corrected target discharging amount to be less than the target discharging amount.

13. An energy storage system comprising:
    a plurality of power converters;
    a plurality of battery units connected to an electrical grid respectively via the power converters; and
    a combined controller configured to control the plurality of power converters and the plurality of battery units,
    wherein each of the plurality of battery units comprises:
        a plurality of battery banks connected in parallel with each other; and
        a distribution controller configured to:
            receive a command including a target charging/discharging amount;

determine a priority order between the plurality of battery banks based on a state of charge (SOC) and a state of health (SOH) of each of the plurality of battery banks;

update the priority order between the plurality of battery banks at every update period, wherein the distribution controller is configured to adjust the update period based on temperatures of the plurality of battery banks, and the update period is increased when the temperatures lower;

select at least some battery banks among the battery banks to be charged or discharged according to the target charging/discharging amount based on the priority order; and perform a charging or discharging on the at least some battery banks according to the target charging/discharging amount so that others of the battery banks are paused.

* * * * *